United States Patent
Walicki, Sr. et al.

(10) Patent No.: US 10,953,737 B1
(45) Date of Patent: *Mar. 23, 2021

(54) HARD YET FLEXIBLE VALANCE FOR AN ENCLOSURE MOUNTED TO A GOLF CAR ROOF

(71) Applicants: Lawrence Walicki, Sr., Boynton Beach, FL (US); Lawrence Walicki, Jr., Boynton Beach, FL (US)

(72) Inventors: Lawrence Walicki, Sr., Boynton Beach, FL (US); Lawrence Walicki, Jr., Boynton Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/360,457

(22) Filed: Mar. 21, 2019

Related U.S. Application Data

(63) Continuation-in-part of application No. 15/151,075, filed on May 10, 2016, now abandoned, which is a continuation of application No. 15/050,435, filed on Feb. 22, 2016, now abandoned.

(60) Provisional application No. 62/119,780, filed on Feb. 23, 2015.

(51) Int. Cl.
*B60J 11/04* (2006.01)
*B62D 65/02* (2006.01)

(52) U.S. Cl.
CPC .............. *B60J 11/04* (2013.01); *B62D 65/024* (2013.01)

(58) Field of Classification Search
CPC ... B60J 5/0487; B60J 7/104; B60J 9/04; B60J 11/04; B62D 25/06; B62D 65/024; Y10S 280/05; B62K 11/04; B62K 19/02; B62K 19/12; B62K 19/06; B62K 19/16

USPC ....... 296/77.1, 78.1, 79–83, 99.1; 135/88.07, 135/88.09

See application file for complete search history.

(56) References Cited

U.S. PATENT DOCUMENTS

| | | | | |
|---|---|---|---|---|
| 3,829,152 A | * | 8/1974 | Hobbs | B60J 1/02 296/77.1 |
| 4,795,205 A | * | 1/1989 | Gerber | B60J 1/04 280/DIG. 5 |
| 4,819,979 A | * | 4/1989 | Moglia | B60J 1/20 296/77.1 |
| 5,259,656 A | * | 11/1993 | Carroll | B60J 11/00 150/159 |
| 5,588,690 A | * | 12/1996 | Showalter | B60J 11/00 135/88.09 |
| 8,845,004 B2 | * | 9/2014 | DeVoss, Jr. | B60J 11/00 296/99.1 |
| 9,004,574 B1 | * | 4/2015 | Fisher | B60J 11/025 296/138 |

(Continued)

*Primary Examiner* — Gregory A Blankenship
(74) *Attorney, Agent, or Firm* — Daniel S. Polley, P.A.

(57) ABSTRACT

A novel valance for a golf car. The inner member of valance is preferably constructed from a stiffer material, as compared to current valances used with golf cars, in order to stiffen the valance to prevent flapping and hitting up against the golf car enclosure by the valance, which is common with conventional valances. Preferably, the material can be a hard flexible material, such as, but not limited to, a soft plastic, polycarbonate or low density polyurethane plastic. The material can also be capable of permitting the fabric to be adhered to the outer and inside surfaces of the inner member such as through the use of spray glue. Preferably, the material selected, in addition to being solid also has some flexibility. The stiffer material helps to prevent or reducing flapping of the valance while the golf car is moving.

13 Claims, 9 Drawing Sheets

(56) References Cited

U.S. PATENT DOCUMENTS

| | | | | |
|---|---|---|---|---|
| 9,248,724 | B1* | 2/2016 | Judisch | B60J 5/0487 |
| 9,561,707 | B1* | 2/2017 | Walicki, Sr. | B60J 5/0487 |
| 2006/0290163 | A1* | 12/2006 | Showalter | B62D 33/0621 |
| | | | | 296/102 |
| 2011/0174448 | A1* | 7/2011 | Haagenson | B60J 5/0487 |
| | | | | 160/124 |
| 2013/0234467 | A1* | 9/2013 | Brown, Jr. | B60J 5/0487 |
| | | | | 296/181.1 |
| 2014/0035313 | A1* | 2/2014 | Sobik | B60J 7/0007 |
| | | | | 296/135 |
| 2014/0232147 | A1* | 8/2014 | Held | B60J 7/0015 |
| | | | | 296/210 |
| 2015/0001872 | A1* | 1/2015 | Rutland | B60J 11/06 |
| | | | | 296/37.7 |
| 2018/0156381 | A1* | 6/2018 | Gulledge | F16M 13/02 |
| 2019/0031001 | A1* | 1/2019 | Guempel | B62D 33/0621 |

* cited by examiner

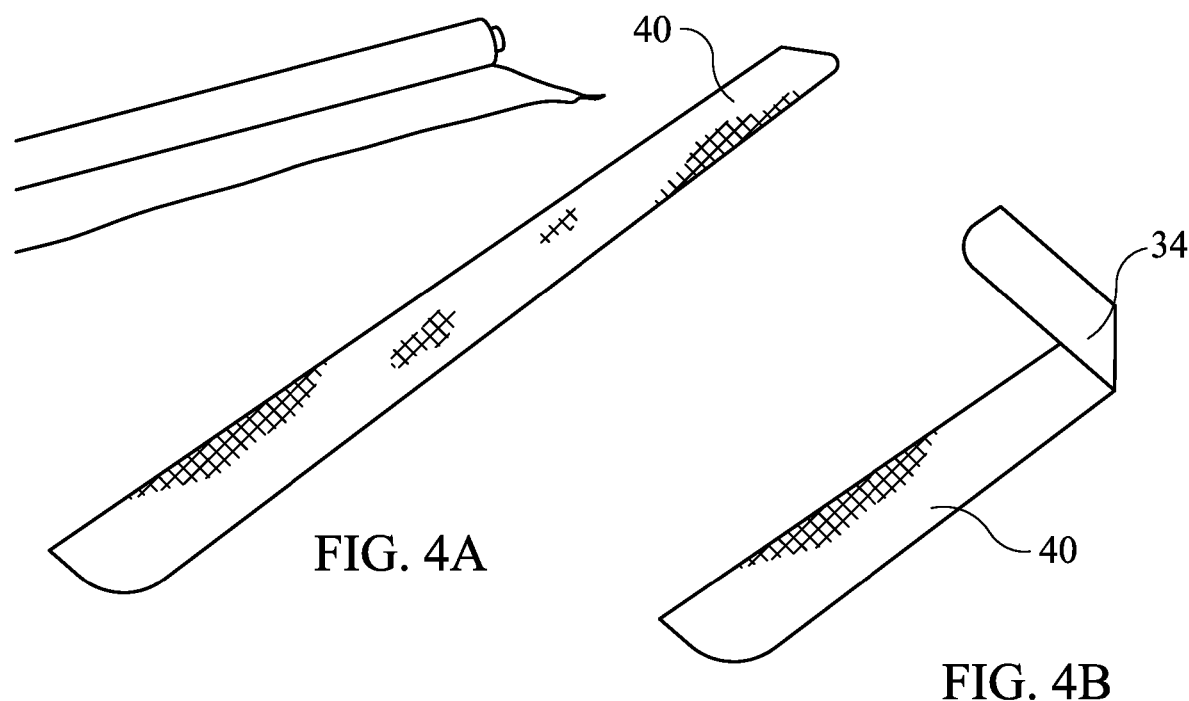
FIG. 4A
FIG. 4B
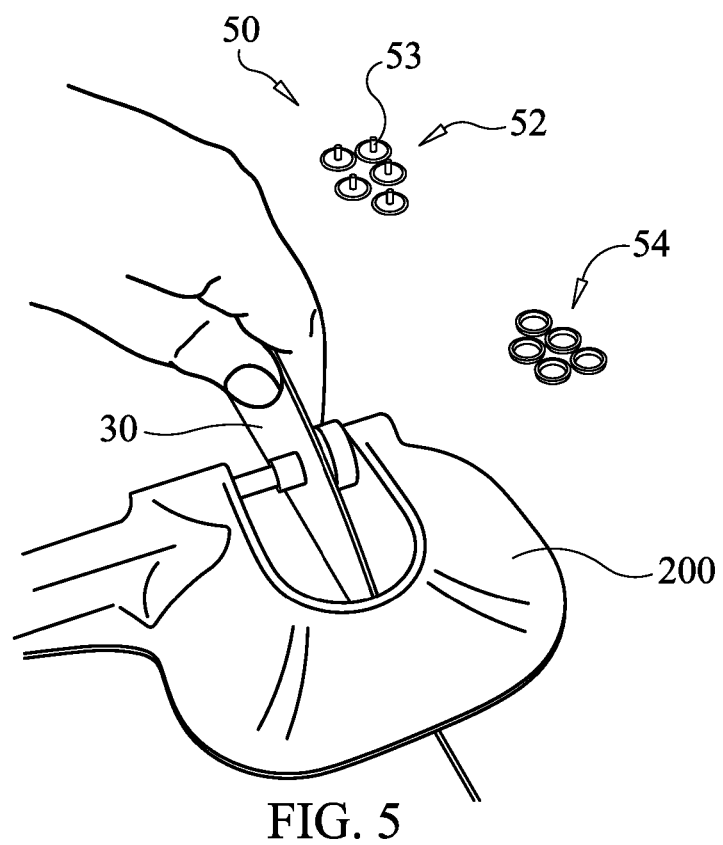
FIG. 5

HARD YET FLEXIBLE VALANCE FOR AN ENCLOSURE MOUNTED TO A GOLF CAR ROOF

This application is a continuation-in-part of U.S. application Ser. No. 15/151,075, filed. May 10, 2016, which is a continuation of U.S. application Ser. No. 15/050,435, filed Feb. 22, 2016, which claims priority to and the benefit of U.S. Application No. 62/119,780, filed Feb. 23, 2015. All applications are incorporated by reference in their entireties for all purposes.

1. FIELD OF THE DISCLOSURE

The present disclosure relates generally to golf carts/golf cars (collectively "golf cars"), and particularly to a novel valance for a golf car.

2. BACKGROUND

Conventional valances for golf cars have two primary functions. The first of these functions is to secure and hide the golf car enclosure when the enclosure is rolled up and not in use. This makes for a very clean and stylish look to the enclosure. The second function is to protect the fabrics especially the clear window which is made from a clear vinyl from the elements such as rain and dirt. These elements will reduce the life of the product. When the enclosure is being used to protect the passengers from inclement weather the side and rear panels are unsnapped from the valances and rolled down. In the enclosure down position, the valances are not secured to anything and as the golf car is moving the valances tend to flap around. The flapping of the valances causes the snaps, used to secure the valances to the side enclosure in the rolled up position, to smack into the roof of the golf car which creates an irritating noise to the occupants traveling in the golf car. The present disclosure provides for a novel valance for a golf car which is directed to addressing the above problems with current golf car valances.

SUMMARY OF THE DISCLOSURE

The present disclosure provides for a novel hard valance for a golf car, with "hard" being considered with respect to conventional valances currently installed on golf cars that are known to flap around when the golf car is moving. The inside valance material is preferably constructed from a stiffer material, as compared to current valances in use, in order to stiffen the valance. Preferably, the material can be a hard and preferably flexible material, such as, but not limited to, a soft plastic, poly-carbonate or low density polyurethane plastic. In a preferred embodiment, polycarbonate is chosen as the material for the hard and preferably flexible material. The inside valance material should also be capable of permitting outer fabric portions to be adhered to the inside valance material such as through the use of spray glue. Other materials for the inner or inside valance can also be used which can include, without limitation, aluminum, fiberglass, wood etc. Preferably, though again not limiting, the material selected though solid also has some flexibility. When the described novel valance is secured to, disposed at or adjacent to the roof of the golf car in one non-limiting embodiment, the snap connectors are not visible from outside of the golf car as they are hidden behind the outer fabric secured to the hard and preferably flexible inner material of the valance.

BRIEF DESCRIPTION OF THE DRAWINGS

FIG. 4*a* is a perspective view of the inner member for the golf car valance with the inner side fabric adhered to the inner side of the valance (when the valance is attached to the golf car);

FIG. 4*b* is a perspective of the inner member of FIG. 4*a* showing one end partially folded to show the outer side of the inner member uncovered at this point of the golf car valance assembly;

FIG. 5 is a perspective view of a conventional snap securing tool being used to secure a socket (receiving member) of a snap connector assembly to the inner member;

DETAILED DESCRIPTION

The present disclosure provides for a novel hard valance for a golf car. The inner valance member is preferably constructed from a stiffer material, as compared to current valances secured to golf cars, in order to stiffen the valance. Preferably, the material chosen for the inner valance member can be a hard and preferably flexible material, such as, but not limited to, a soft plastic, polycarbonate or low density polyurethane plastic. The material should also be capable to permit outer fabric portions to be adhered to the material such as through the use of spray glue. Other materials for the inner or inside valance can also be used which can include, without limitation, aluminum, fiberglass, wood etc. Preferably, though again not limiting, the material selected though solid also has some flexibility. In a preferred embodiment, polycarbonate is selected for the hard and preferably flexible material used to construct the inner member of the novel valance.

Figure 1:
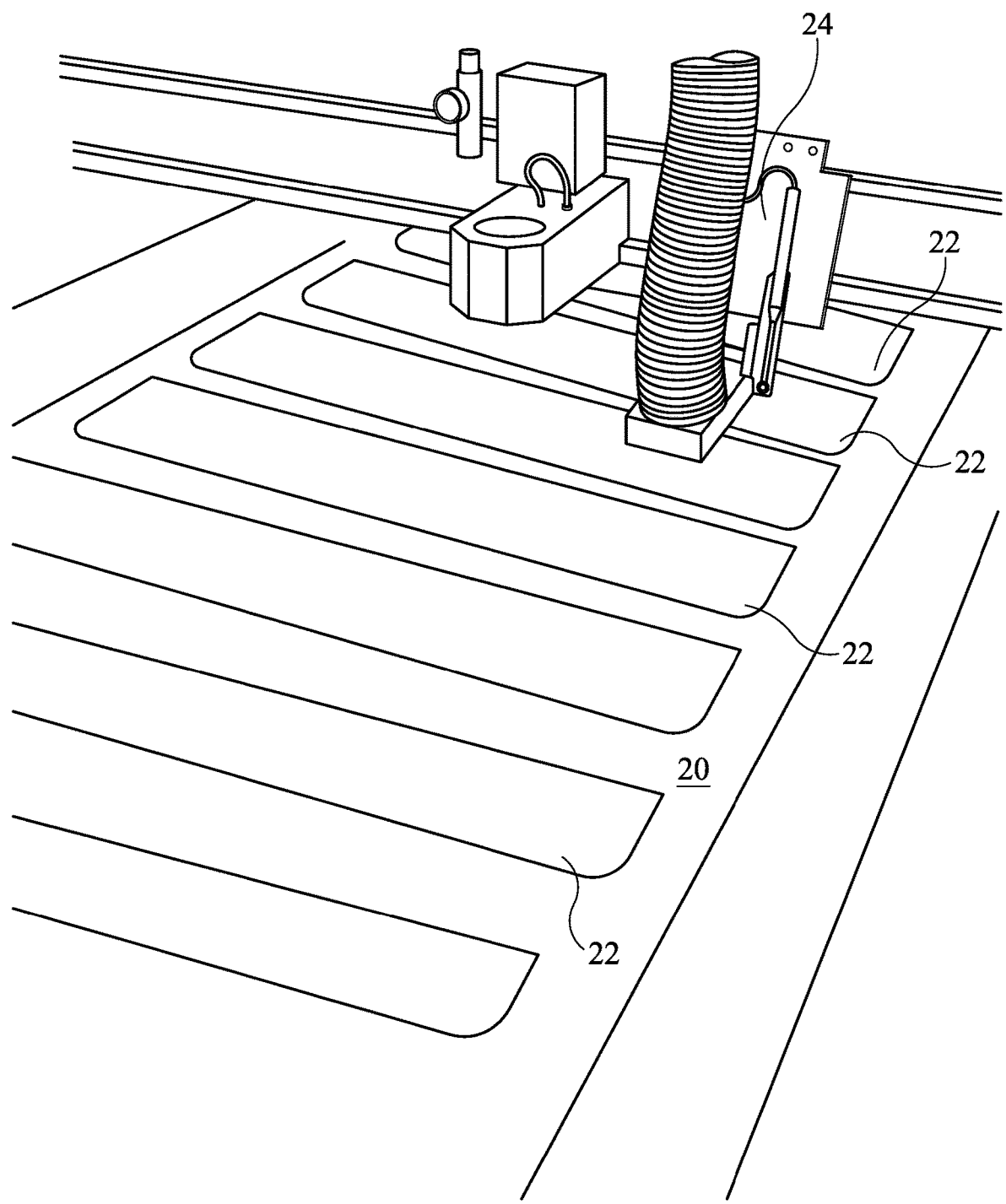
FIG. 1 is a perspective view of a sheet of material containing a plurality of inner members for the disclosed golf car valance and a conventional machine used to cutout the inner member from the sheet.

As seen in FIG. 1 the shape for the valance can be preferably shown/drawn/printed, etc. on a sheet of the soft plastic or low-density polyurethane plastic in a preferred embodiment, though other materials that provide a flexible but yet relatively stiff inner member, can be used and are considered within the scope of the disclosure. In one non-limiting embodiment, a sheet 20 of material is provided and can have one or more inner member shapes 22 drawn thereon. A conventional cutting tool 24 or other cutting tool can be used to cut an inner member 30 from sheet 20. Inner member 30 is cut to its desired shape, which shape dimensions are chosen preferably based on the roof area dimensions of the golf car and the location where the hard valance 16 is to be secured (left side, right side, front, back, etc.). As seen in several of the figures, where the bottom edge meets the two end edges of inner member 30 can be curved to form rounded corners.

Figure 2:
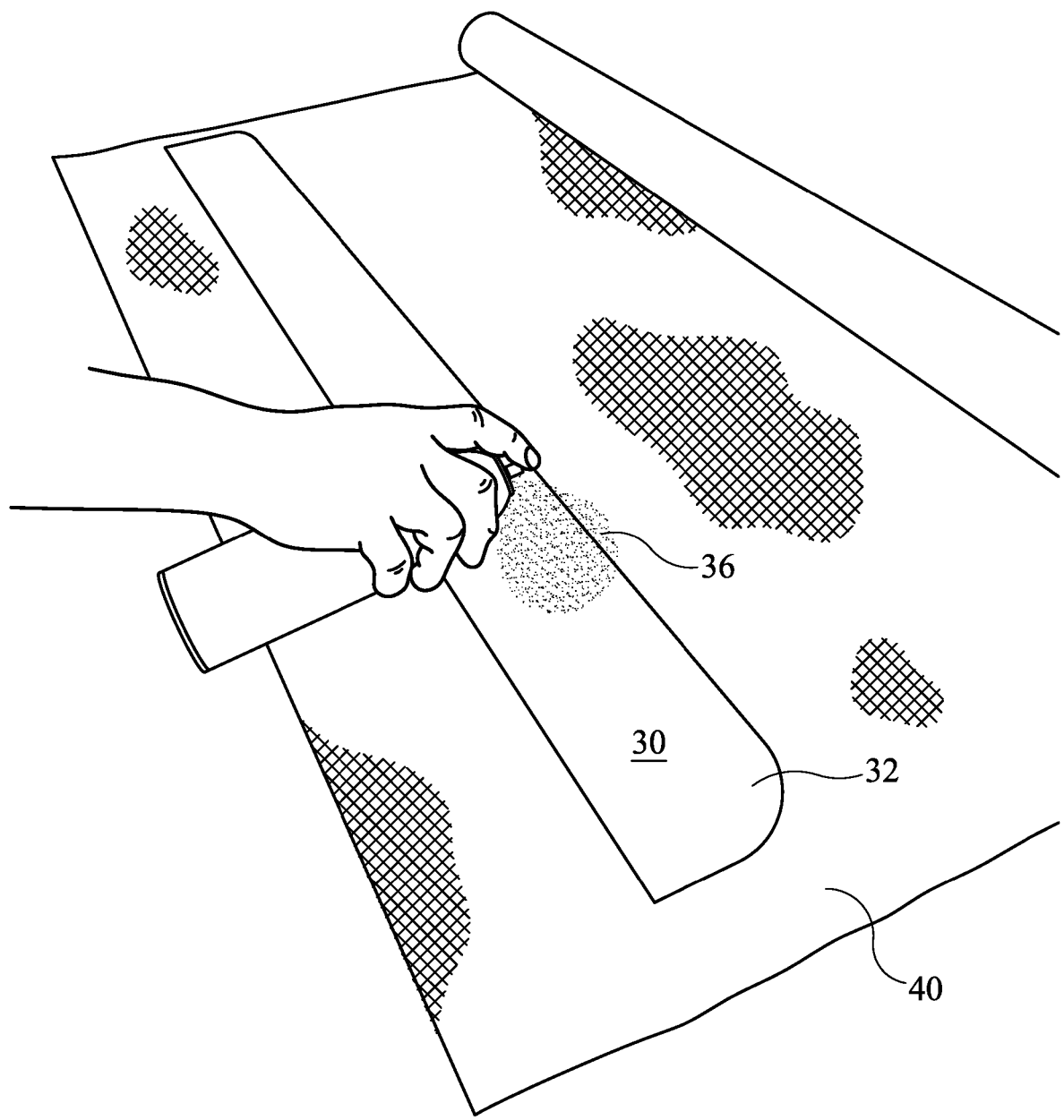
FIG. 2 is a perspective view of one side of a cutout inner member being prepared for attached to the inner side fabric.

As seen in FIG. 2 after cutting, an elongated inner member 30 (which can be constructed from soft plastic) 30 is formed. The shape of elongated member is preferably chosen based on the dimensions, shape, etc. of the golf car 100, particularly around the roof area 102. Preferably the soft plastic is cut to the exact or virtually exact size and shape of the valance 16 needed. An inside surface 32 of soft plastic inner member 30 (side facing the interior of the golf car when the valance 16 is secured to golf car 100 at roof area 102) can then be applied with a spray glue or other adhesive 36, for adhering an inner fabric 40 to inner surface 32. Inner fabric 40 can also have spray glue or other adhesive 36 applied to it to increase the attachment of inner fabric 40 to inside surface 32 of the soft plastic inner member 30. In one non-limiting embodiment, inner fabric 40 can be a dark fabric and can be made from Sunbrella fabric material, though such is not considered limiting.

Figure 3:
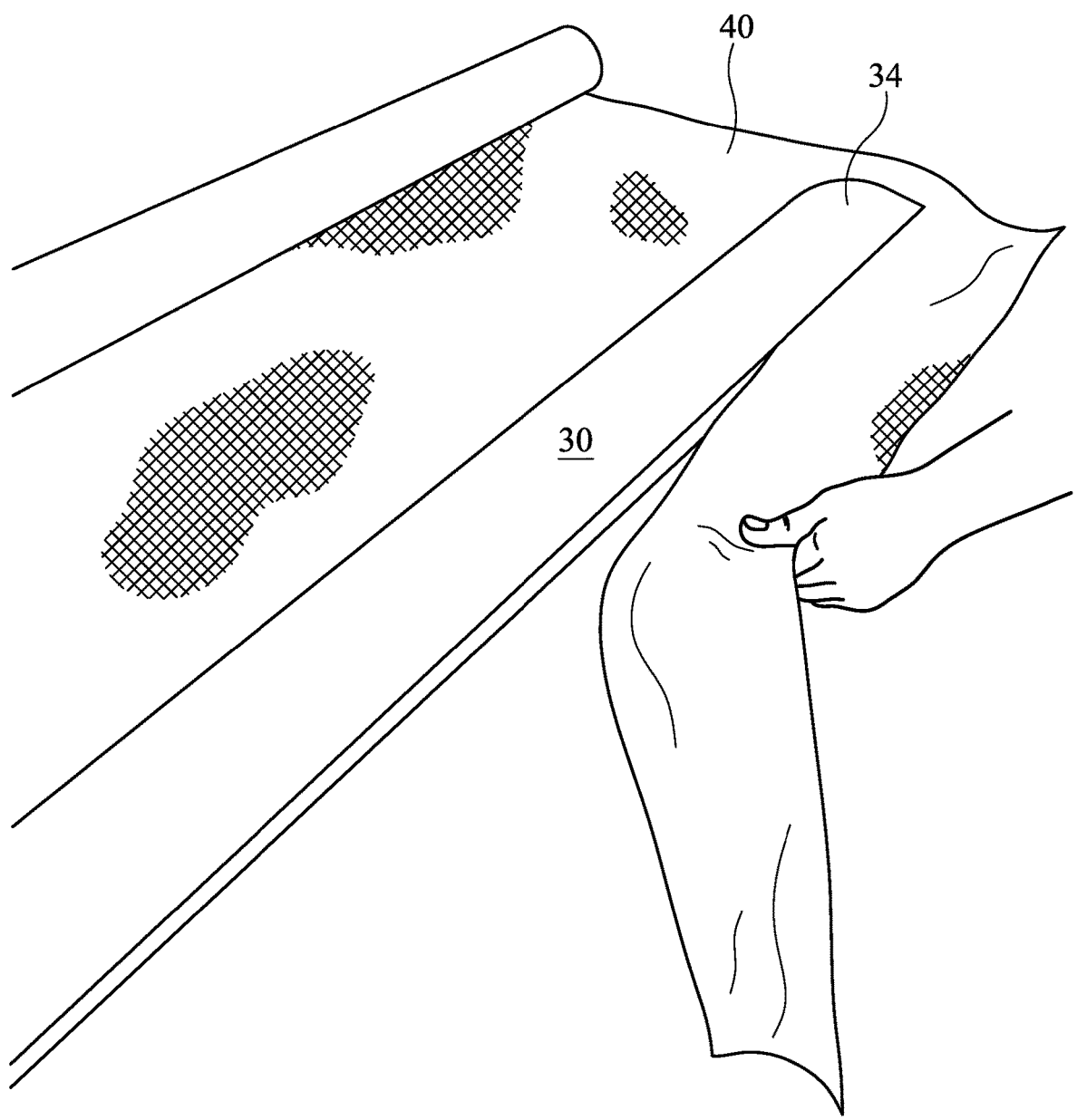
FIG. 3 is a perspective view of the inner side fabric being cut to the size of the inner member.

As seen in FIG. 3, after adhering inner fabric 40 to inner surface 32 of soft plastic inner member 30, any excess fabric of inner fabric 40 can be cut off, such that inner fabric 40 is also in the shape of soft plastic inner member 30. As seen in FIG. 4, a partially constructed valance is created and ready for the installation of the one or more snap portions 50, and preferably a plurality of snaps portions 50 (See FIG. 5). Preferably, the portion of the snap securement assembly that is installed or attached to inner member 30 is the female receiving (socket) portion 50, though it is within the scope of the disclosure to secure the male insertion stud) portion of a snap securement assembly in lieu of one, a plurality or all of the female portions 50.

Prior to installation/attachment to inner member 30, female portions 50 are provided in two pieces, which are backing section 52 and receiving section 54. Receiving section 54 serves as the mating section. Where the male portion of the snap assembly is used instead of female portions 50, the stud/insertion section of the male snap portion would be positioned where receiving section 54 is attached to inner member 30 as described below.

The female snap portions 50 (and/or male snap portions) are then installed, preferably through the use of conventional pressing snap tool 200 (FIG. 5). Other conventional snap installation tools or other tools can also be used to install female snap portions 50 and/or male snap portions. As seen in FIG. 7, the back sections 52 of female portions 50 are positioned on outer side surface 34 of the soft plastic inner member 30, while receiving section 54 is positioned on inner side 32 over inner fabric 40 (See FIG. 6). Post 53 of backing section 52 extends through inner member 30 and is mated with receiving section 54 during installation to hold backing section 52 and receiving 54 in place/in position with respect to inner member 30.

Figure 6:
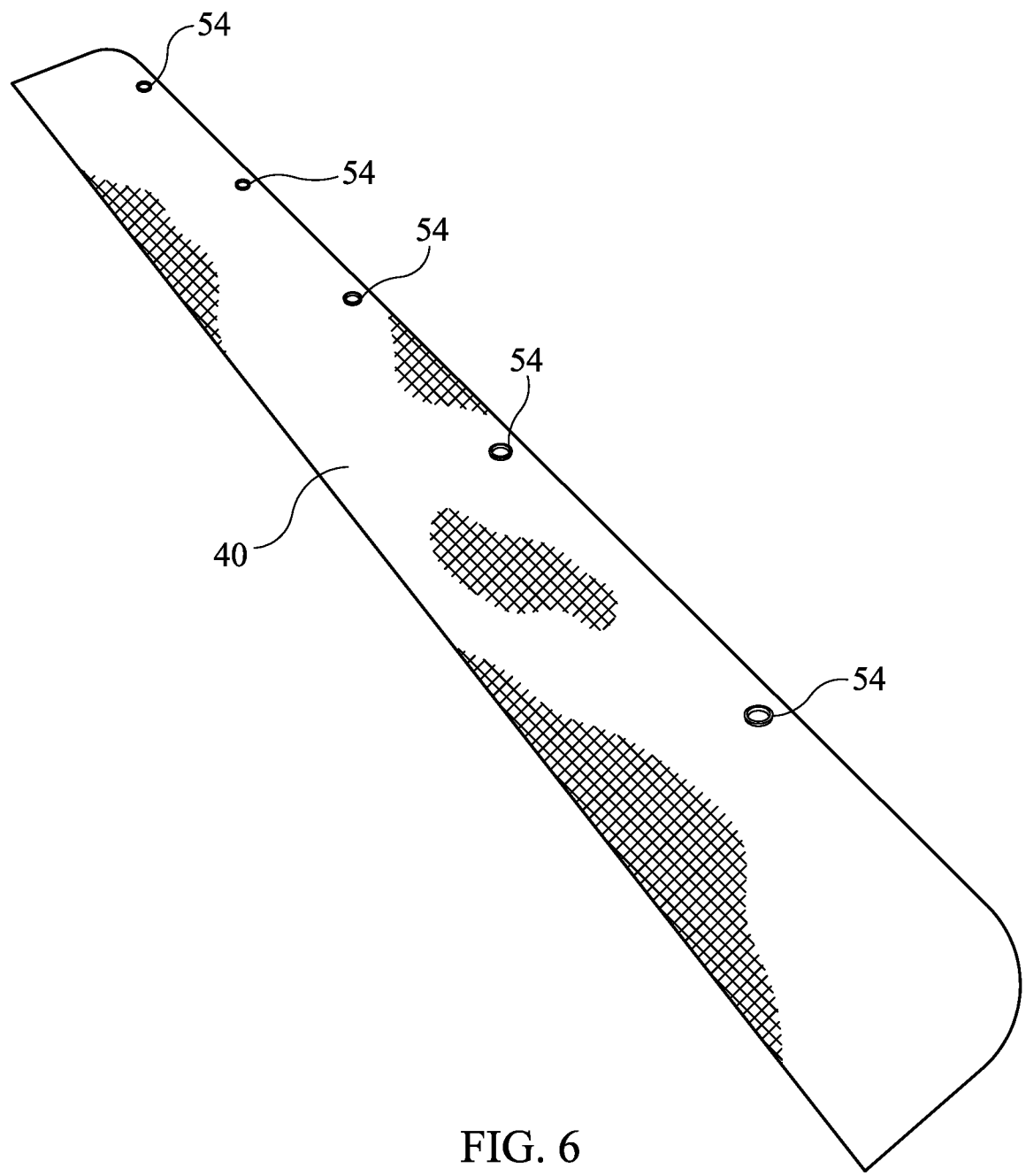
FIG. 6 is a perspective view of the inner member with the inner side fabric adhered thereto and with a plurality of female receiving snap connector portions installed.
Figure 7:
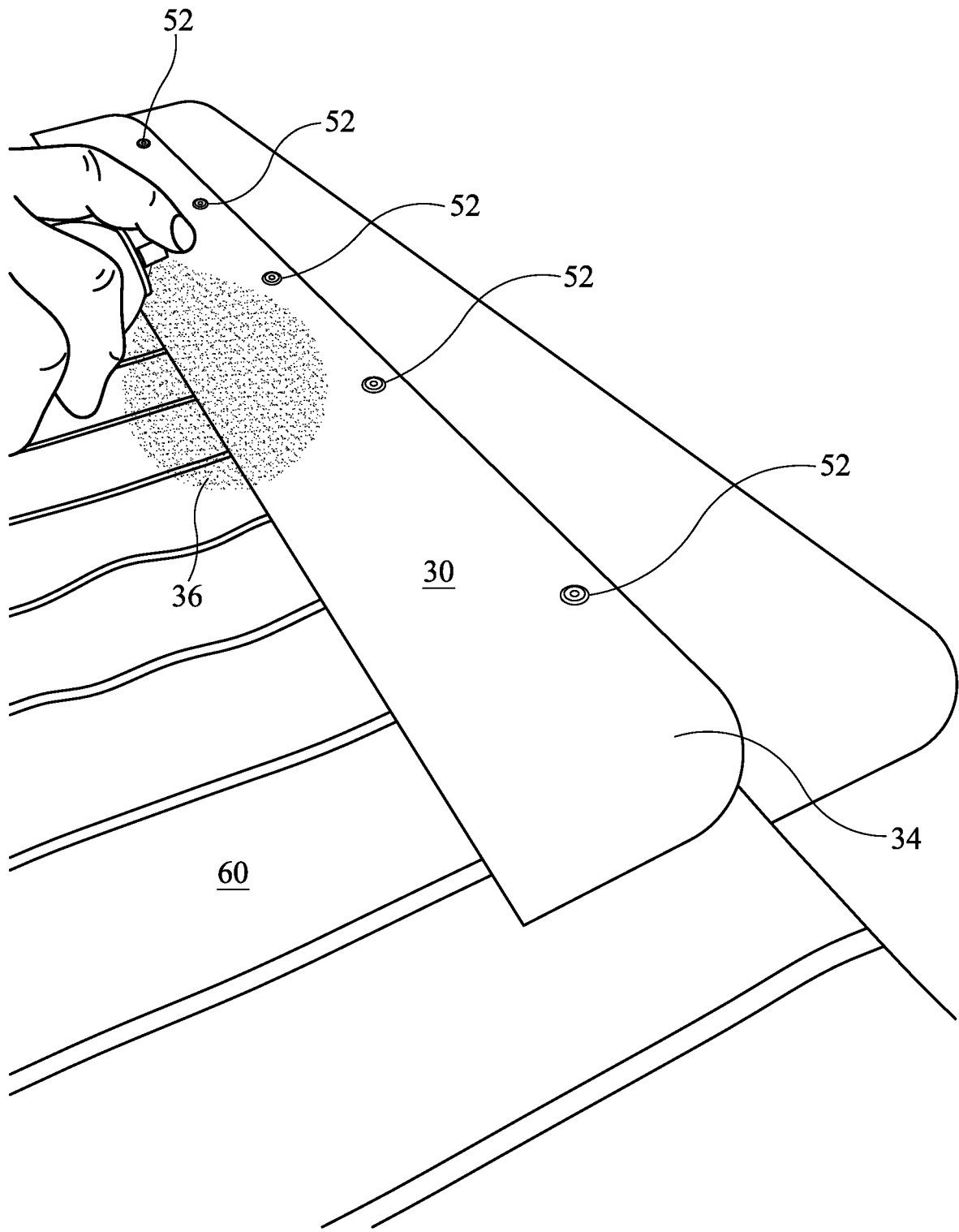
FIG. 7 is a perspective view of the outer side of the inner member and the outer side fabric being prepared.

As seen in FIG. 6, the mating section of the snap portion (i.e. female receiving member 50 if the enclosure straps have male insertion mating members, or vice versa, etc.) is positioned on the inner side 32 of inner member 30 over inner fabric 40. The use of the pressing snap tool 200 causes a hole to be created through inner member 30 and inner fabric 40 where each female (or male) snap portion 50 of the snap connector assembly is installed.

As described below, preferably when the assembly of valance 16 is completed, the attached backing sections 52 of female snap portions 50 are hidden from view, behind a decorative fabric 60 that is adhered to the outside or outer side surface 34 of inner member 30. Though not limiting or necessary for use of hard valance 16, the design, decoration and/or color(s) for decorative fabric 60 can be selected to match the color, design or decoration of the enclosures or golf car 100. Decorative fabric 60 can also be sized, cut and secured to outer side 34 of inner member 30, similar to how inner fabric 40 is secured (i.e. spray glue 36, other adhesive, etc.) to the inner side 32 of inner member 30 (See FIG. 7).

Figure 8:
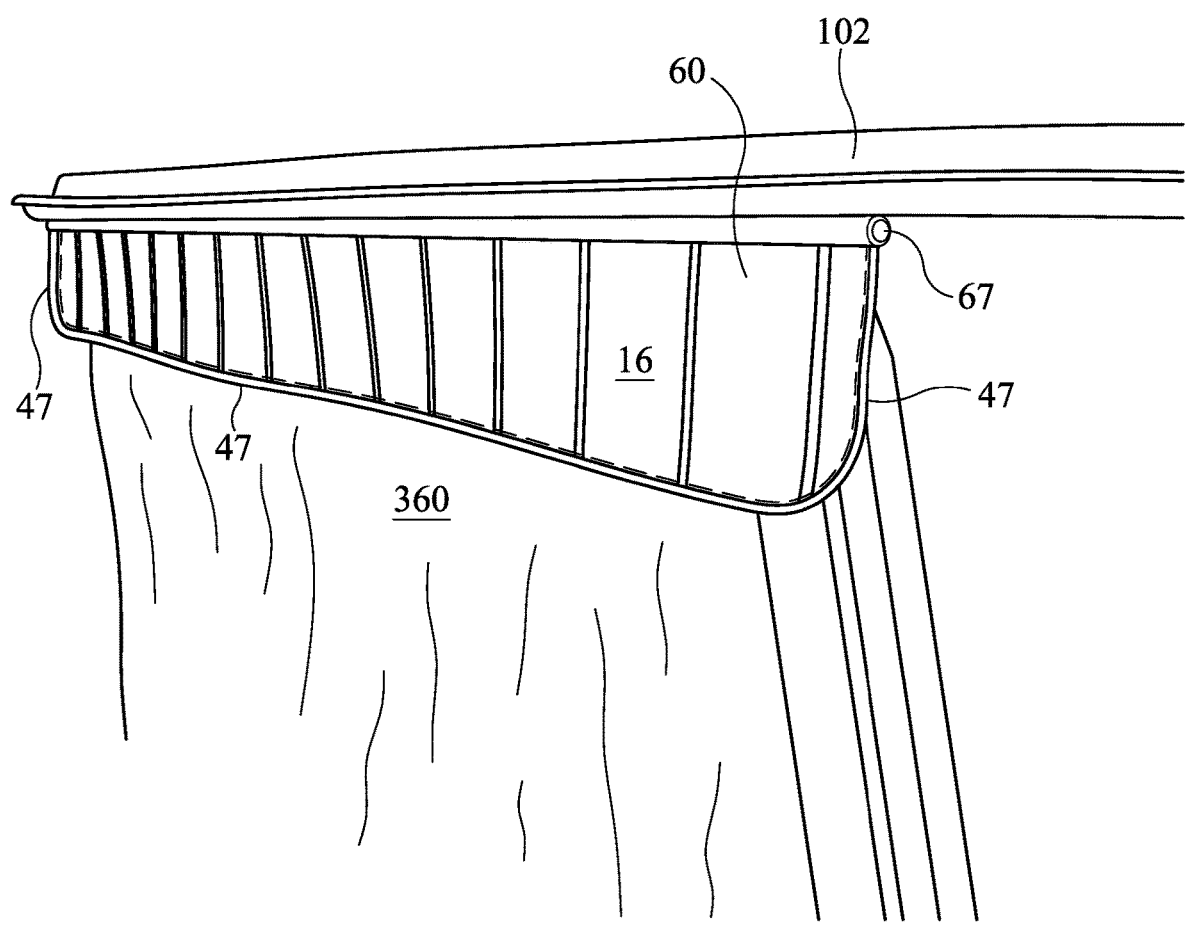
FIG. 8 is a perspective view of the disclosed valance secured to the side of a golf car.

Once decorative fabric 60 is properly secured to outer side 34 of inner member 30 (i.e. soft plastic sheet, etc.), the backing sections 52 of the snap portions 50 are hidden from view as they are located between decorative fabric 40 and outer side 34 of inner member 30 (See FIG. 8). With decorative fabric 60 attached to outer side 34 of inner member 30 and the excess material of fabric 60 cut away, the partially constructed valance can be binded, such as, but not limited to with extending fabric 60 (e.g. 1" Sunbrella fabric) over the top edge of inner member 30 that there is no exposure at the covered portion (top edge of inner member 30) to finish the outer perimeter. The elongated edge of inner member 30, where the female receiving portions are closest to, will be considered the bottom edge of inner member 30. Extruded welting 47 can then he sewn on, or otherwise attached at least the first end edge, the second end edge and the bottom edge of inner member 30, as well as the top edge of inner member 30. A rod holder 63 can be secured to the top edge or the top edge welting of valance 16 and can include a passageway 65 for receipt of a securing rod 67. At this point valance 16 can be considered constructed (finished) and ready for securement/installation on golf car 100. Though not considered limiting, decorative fabric 60 is provided with a different design, color, pattern and/or appearance as the design, color and/or appearance for inner fabric 40.

Figure 9:
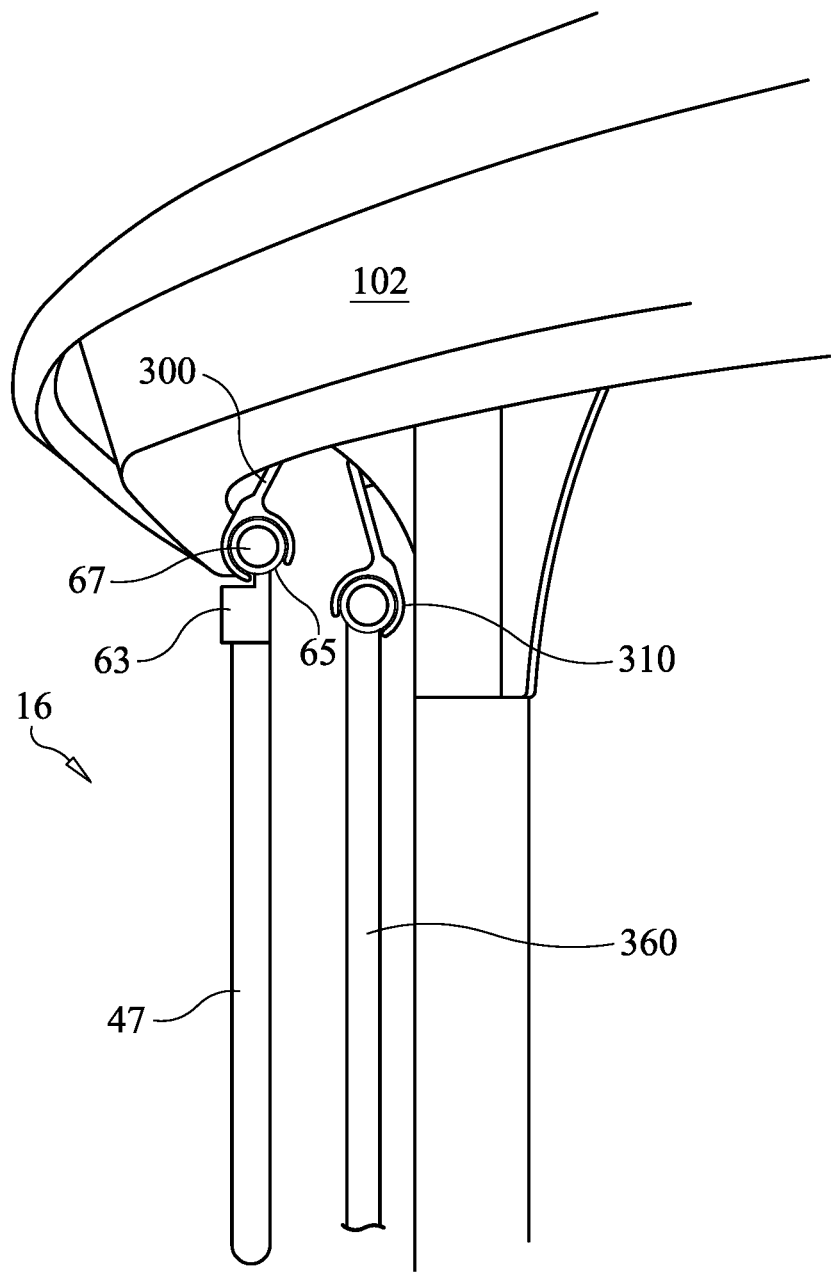
FIG. 9 is a side view of the disclosed valance secured to the side of a golf car and revealing a second track for securing the golf car side enclosure separate from the securement point of the valance to the golf car.
Figure 10:
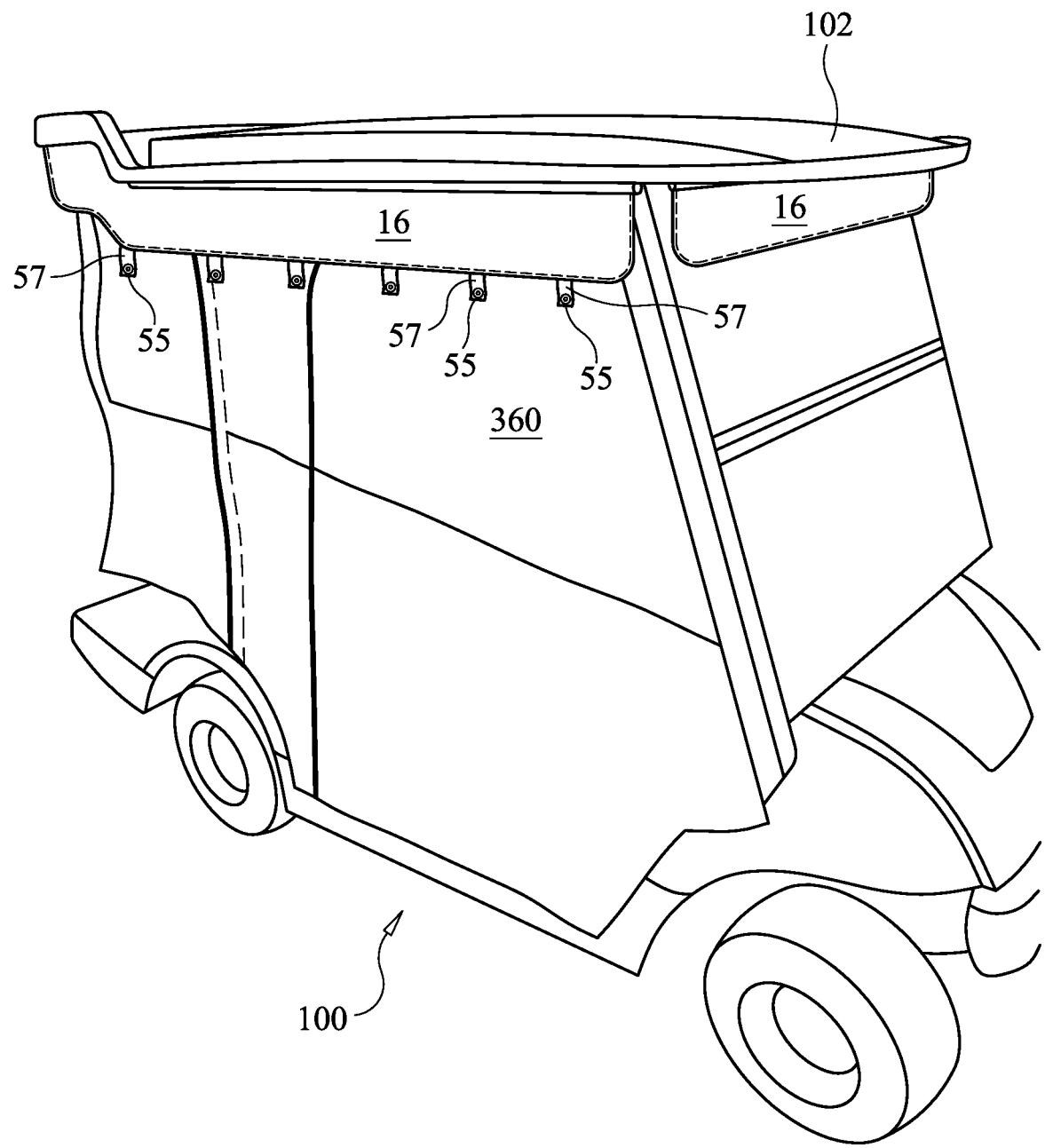
FIG. 10 is a perspective view of the disclosed valance secured the side of a golf car and a second disclosed valance secured to the front of the golf car.

Finished valance 16 can be installed on the golf car preferably through its own separate track or channel 300 secured to or near roof 102 of golf car 100 (See FIGS. 8-10), whereas a second track 310 is provided for securing the side enclosure 360 (See FIG. 9). Though not viewable from outside of the golf car 100, receiving sections 54 of female portions 50 of valance 16 are available for mating with the male insertion snap portions 55 of the holding straps 57, for holding a rolled up enclosure 360. Holding straps 57 and their associated male insertion snap portions 55 can be seen in FIG. 10. The end of strap 57 not having the non male insertion snap portion can be sewn onto the side enclosure which can cause straps 57 to hang (as seen in FIG. 10) when side enclosure 360 is in an unrolled downward "in use" position.

Wherever a valance 16 is to be secured, preferably a track 300 will be provided. Therefore, if the golf car is to have three valances (both sides and front) then a first track 300 will be secured for the first side, a second track 300 will be secured for the second side and a third track will be secured for the front. Where the back is also provided with a valance 16, a track 300 will be secured for the back. Other configurations of valances 16 (back only, front only, sides only, etc.) will be similarly secured with corresponding number of tracks 300.

Preferably rod holder 63 (which acts a support or housing for rod 67) along with rod 67 are slid into position by inserting the end of holder 63 and rod 67 into one end of track 300 and then slid along track 300 until holder 63 and rod 67 are in proper position with respect to the roof area 102 of golf car 100, which will also properly position valance 16 with respect to the roof area 102 of golf car 100.

The hard valance is preferably for use with the sides and front areas of the golf car and can also be used for the back area of the golf car, though such is not considered limiting.

Through the use of a heavier or hard inner member 30 for valance 16, the weight of valance 16, if not totally preventing, will significantly reduce or limit, the smacking of the snaps and valance on roof 102 and the associated annoying noise or sound produced from such smacking, that is currently experienced with conventional valances.

The novel valance of the instant disclosure can be considered a hard or stiff valance, yet preferably flexible, and, as noted above, the material selected for the inner member and/or any other part(s) of the valance can be any type of material that stiffens the valance, such as, but not limited to, aluminum, metal, steel, stainless steel, plastic, foam, paper, cardboard, fabric, etc. The stiffened/hard member can be secured to the outer material(s) in any possible way, and all are considered within the scope of the disclosure. Non-limiting securement examples include, glues, adhesive, tapes, welding, staples, sewing, punched, snaps, hook and loop fasteners (VELCRO), etc. The inner member can also be free floating/inserted within and enclosed/encompassed by the outer materials.

The novel hard valance can be hung by itself or married to the golf car enclosure or roof.

The novel hard valance can be provided with or without snaps or other fastening devices used to secure other items to the valance. The hard/stiff nature of the valance is achieved without these fastening devices. Where snaps are provided, they can be seen or unseen, including the back sections of the snaps. In addition to snaps, any other type of fastening device can be provided with the novel hard valance, including, without limitation, lift-the-dot, hook and loop fasteners (VELCRO), TENAX fasteners, LOXX fasteners, bungie cords, hooks, zippers, clips, buttons, button holes, gromets, pins, rope, string, straps, tapes, adhesives, glues, etc. and any other commonly known fastening device and all are considered within the scope of the disclosure.

The snaps and other fastening devices can be provided through the stiffening materials as well as not through the stiffening material.

As alternative securement areas and/or mechanisms, in lieu of its own track, the valance 16 can be sewn to the enclosure or secured to, at or adjacent to the top/roof of the golf car enclosure by any other conventional securement mechanism.

All sizes, shapes, configurations, securement or attachment mechanisms, dimensions, measurements, distances, part locations, materials, orientations, methods of manufacture, etc. discussed above or shown in the drawing figures are merely by way of example and are not considered limiting and other sizes, shapes, configurations, securement or attachment mechanisms, dimensions, measurements, distances, part locations, materials, orientations, methods of manufacture, etc. can be chosen and used and all are considered within the scope of the invention. Thus, the embodiment and manufacture methods shown in the Figures/drawings is merely a non-limiting embodiment for the novel hard valance.

Various materials and components can be used for the binding and securing rod support/holder. Also, the appearance, designs, patterns, color(s) for the outer decorative fabric is not considered limiting to any particular appearance, design, pattern, color or colors.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the disclosure has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A hard valance adapted for securement to a roof or top area of an enclosure of a golf car, said hard valance comprising:
    a stiffening member specifically constructed from a material which will reduce an ability of an installed valance secured at or to the roof or top area of the enclosure from flapping or hitting up against the golf car during normal use of the golf car, the stiffening member having a first inner side surface and a second outer side surface;
    an outer member positioned adjacent to the second outer side surface of the stiffening member to cover the second outer side surface of the stiffening member; and
    an inner member positioned adjacent to the first inner side surface of the stiffening member to cover the first inner side surface of the stiffening member;
    wherein the outer member is a first piece of fabric and the inner member is a second piece of fabric.

2. The hard valance of claim 1 wherein the stiffening member is elongated and having a length chosen based on a length size of either a side, back or front of a roof or top area of the golf car enclosure.

3. The hard valance of claim 1 wherein the inner member and the outer member encompass or enclose the stiffening member such that the stiffening member is at least substantially hidden during use.

4. The hard valance of claim 1 wherein the outer member is secured to the second outer side surface of the stiffening member and the inner member is secured to the first inner side surface of the stiffening material.

5. The hard valance of claim 1 further comprising one or more connectors or fasteners secured directly or indirectly to the stiffening member for attaching another object to the stiffening member.

6. The hard valance of claim 1 wherein the stiffening member is constructed from one or more of the following materials: polycarbonate, soft plastic, polyurethane plastic, metal, aluminum, steel, stainless steel, wood, cardboard, foam, paper, fiberglass and/or fabric.

7. A hard valance adapted for securement to a roof or top area of an enclosure of a golf car, said hard valance comprising:

a stiffening member specifically constructed from a material which will reduce an ability of an installed valance secured at or to the roof or top area of the enclosure from flapping or hitting up against the golf car during normal use of the golf car, the stiffening member having a first inner side surface and a second outer side surface, the stiffening member is elongated and having a length chosen based on a length size of either a side, back or front of a roof or top area of the golf car enclosure;

an outer fabric member positioned adjacent to the second outer side surface of the stiffening member to cover the second outer side surface of the stiffening member; and an inner fabric member positioned adjacent to the first inner side surface of the stiffening member to cover the first inner side surface of the stiffening member;

wherein the inner member and the outer member encompass or enclose the stiffening member such that the stiffening member is at least substantially hidden during use.

8. The hard valance of claim 7 wherein the outer fabric member is secured to the second outer side surface of the stiffening member and the inner fabric member is secured to the first inner side surface of the stiffening material.

9. The hard valance of claim 7 further comprising one or more connectors or fasteners secured directly or indirectly to the stiffening member for attaching another object to the stiffening member.

10. The hard valance of claim 7 wherein the stiffening member is constructed from one or more of the following materials: polycarbonate, soft plastic, polyurethane plastic, metal, aluminum, steel, stainless steel, wood, cardboard, foam, paper, fiberglass and/or fabric.

11. A method for stiffening a valance for use at a top or roof area of an enclosure for a golf car to reduce flapping of the valance during normal use of the golf car, comprising the steps of:

(a) providing a valance having a first inner member and a second outer member; and (b) providing a stiffening member between the first inner member and second outer member;

wherein the first inner member is a first piece of fabric and the second outer member is a second piece of fabric which at least substantially encompass or enclose the stiffening member.

12. The method for stiffening a valance of claim 11 wherein the stiffening member is an elongated member having a length chosen based on a length size of either a side, back or front of a roof or top area of the golf car enclosure.

13. The method for stiffening a valance of claim 11 further comprising the step of securing or positioning the valance at, near or adjacent to a top or roof area of the enclosure.

* * * * *